United States Patent

Connally

[15] 3,681,686

[45] Aug. 1, 1972

[54] CONDUCTOR IDENTIFICATION VIA COUNTING MEANS AT A REMOTE POSITION

[72] Inventor: Douglas R. Connally, Austin, Tex.

[73] Assignee: A.P.C. Industries, Inc., Mineral Wells, Tex.

[22] Filed: July 27, 1970

[21] Appl. No.: 58,407

[52] U.S. Cl. .................................324/66, 179/175.3

[51] Int. Cl. .......H04b 3/46, G01r 19/00, G01r 31/02

[58] Field of Search ........................................324/66

[56] References Cited

UNITED STATES PATENTS

| | | | |
|---|---|---|---|
| 3,288,943 | 11/1966 | Bohnenblust | 324/66 X |
| 3,287,509 | 11/1966 | Bohnenblust | 324/66 X |
| 3,252,088 | 5/1966 | Palmer | 324/66 |
| 3,288,945 | 11/1966 | McNair et al. | 324/66 X |

*Primary Examiner*—Gerard R. Strecker
*Attorney*—Wofford and Felsman

[57] ABSTRACT

Improved method for cable conductor identification characterized by automatically stepping a source of an identifiable signal onto respective conductors at an identified end thereof, and synchronously stepping a co-connected counter at a remote position where a conductor is to be identified until the tone is detected on a given conductor with which the counter is also connected, and thereupon stopping the counter. The counter thus identifies the conductor being monitored. Also disclosed are specific embodiments in which a plurality of conductors are identified by a plurality of counters at the remote position, as well as the structure of apparatus enabling carrying out the invention. The invention alleviates problems with propagation delay, since no feedback is required; and it allows high rates, or frequencies, of stepping while still obtaining positive identification of the conductors, since the identifiable signal and a counting signal are impressed onto conductors at the identified end concurrently within a given sub-cycle as nearly simultaneously as required by the frequency of the stepping.

9 Claims, 1 Drawing Figure

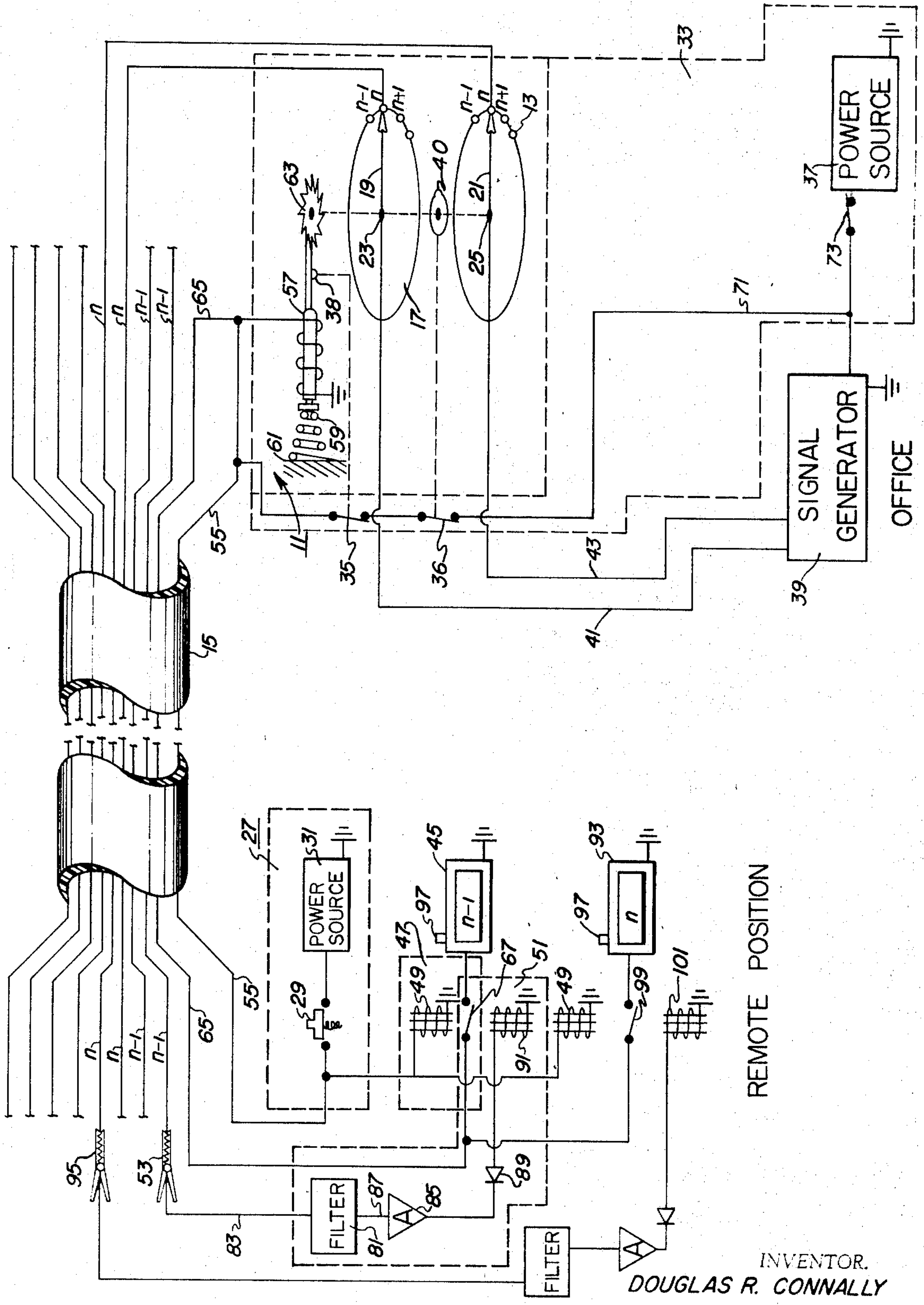
INVENTOR.
DOUGLAS R. CONNALLY
BY
[signature]
ATTORNEYS

CONDUCTOR IDENTIFICATION VIA COUNTING MEANS AT A REMOTE POSITION

BACKGROUND OF THE INVENTION

1. Field of the Invention

This invention relates to identification at a remote position of conductors in an electrical system in which the conductors are identified at one end of a multi-conductor means. This invention particularly relates to method and system whereby a repairman working in the field on a multi-pair cable in communications equipment may, through the use of automated equipment at the office, select and positively identify individual wires and numbered wire pairs at the remote position.

2. Description of the Prior Art

Identification of conductors in a multi-conductor means has been a problem in several areas; such as, aircraft wiring, ship wiring and telephone systems. The greatest distances involved are in telephone systems. In telephone systems, it is often necessary to repair a cable which has been severed; or it may be desirable to change a group of wire pairs from one cable connecting field phones with the office to another cable going to the office, freeing the first cable for a more convenient grouping of wire pairs; e.g., service to a new shopping center. Accordingly, the primary description given herein will be with respect to telephone systems. It is believed that once the principles are clear with respect to telephone systems, application to other areas may be made by one skilled in the art using the principles and detailed description in conjunction with the generalized description herein.

The prior art shows complex, automatically and synchronously rotating office units and follower stepping indicators in the field which rotate together until a discontinuity of a wire is detected and that discontinuity signaled, stopping both units simultaneously. Also known in the prior art are complex coded signals impressed at the office and detected at the field position. Such elaborate units require high levels of skill to maintain them in good working order and even then are not altogether reliable because of the adverse effects of propagation and propagation delays over any communication link such as conductors in the cable.

At the other end of the spectrum of apparatus available, the prior art shows simple systems in which a helper at the office imposes a tone onto a given wire and the repairman at the field position searches through the wires until he finally detects the tone on the given wire. This system is as dependable as the repairman detecting the tone, as distinguished from capacitance coupled tones on adjacent wires, but is expensive and time consuming since it requires two workers, both of which must be skilled and reliable in their work.

The prior art also discloses systems in which a given numbered wire can be dialed from the remote position. This system is useful for identifying a single wire pair but becomes time consuming when multiple wire pairs are to be identified and operated upon; such as, when a group of wire pairs is to be changed from one cable to another cable.

Systems are also known in which the tone applied at a field, or remote, position steps relays in the office through a sequence of tens and units to feed back information as to the particular cable pair on which the tone was applied. Also a system is known in which sets and subsets of signals are applied at the office, detected in the field; then the wires rearranged in the field in complementary subsets and the signals again applied such that when mathematically plotted, the combination of unique signals afforded discrete identification. It is readily apparent that such systems were complex and not altogether reliable; also requiring a high level of skill in the planners and operators; and in maintaining the equipment.

Accordingly, it can be seen that the prior art has not provided a simple, economical method and system; employing reliable, long tested equipment; that would identify, with certainty and speed, conductors in a multi-conductor means without a time consuming operation requiring a high level of skill in the operating personnel, or a plurality of personnel.

BRIEF DESCRIPTION OF THE DRAWING

The FIGURE is a schematic illustration of one embodiment of this invention as related to a telephone system.

DESCRIPTION OF PREFERRED EMBODIMENT(S)

Referring now to the figure, the system for identifying wire pairs in a multi-wire telephone cable includes a sequential stepping switch 11 located at the end of a telephone cable where the wire pairs are identified; ordinarily, at an office where the wire pairs are connected in numerical order to a panel. Sequential stepping switch 11 has a plurality of contacts 13. Contacts 13 are connected, respectively and sequentially, according to their identification with the wire pairs in cable 15. For example, the *n*th wire pair is illustrated being connected to one of contacts 13, a first wire being connected to the upper deck of contacts and a second wire in the wire pair being connected to the correlative contact in the lower deck of contacts.

Each deck 17 has its plurality of contacts electrically connected with the respective wires, or conductors, and electrically connectable via respective wiper arms 19 and 21 with respective terminals 23 and 25. The term "terminals" is used in its broad sense as reference points in an electrical circuit.

Stepping switch 11 has wiper arms 19 and 21 mechanically connected with stepping ratchet 63. A solenoid 57 is mounted via spring 59 on support 61. Solenoid 57 is pulled toward support 61 when energized, its pawl picking up the next notch in stepping ratchet 63. When thereafter deenergized, spring 59 returns solenoid 57 to normal, advancing stepping ratchet 63 one notch; thereby advancing the respective wiper arms to the next contact.

An automatic stepping means 33 is connected with sequential stepping switch 11. Automatic stepping means 33 is operable, when actuated, to cause sequential stepping switch 11 to electrically connect, individually and sequentially, respective ones of a predetermined group of the contacts with their respective terminal. Ordinarily, the predetermined group will comprise all of the contacts. Automatic stepping means 33 comprises power source 37 and contact switches 35 and 36 serially connected with solenoid 57. Contact switch 35 is closed for automatically energizing solenoid 57 when solenoid 57 is returned to its normal, deenergized position. Contact switch 35 is opened by cam 38 when energized solenoid 57 has moved toward support 61 sufficiently for its pawl to pick up the next notch in stepping ratchet 63. Contact switch 36 is opened by cam 40 for stepping sequential stepping switch 11 in the zero or starting, position. COntact switch 36 is closed in all other positions. Thus, it can be seen that sequential stepping switch 11 will automatically continue to step its wiper arms around to the respective contacts, connecting respective conductors and terminals, until contact switch 36 is opened.

A source of an identifiable signal such as signal generator 39 is connected via conductors 41 and 43 with respective terminals 23 and 25 for imposing an identifiable signal onto each conductor that is connected with the respective terminal.

A communication link is provided between the office and the remote position and interconnects components at the respective locations. For example, an actuating means 27; such as, switch 29 and power source 31; is located at the remote position and is connected via the communication link with sequential stepping switch 11. A counting means 45 is provided at the remote position. A connecting means 47 comprising a latching relay 49, is responsive to actuating means 27 and is operable to connect counting means 45 onto the communication link and with sequential stepping switch 11 and automatic stepping means 33 upon depression of switch 29.

Specifically, conductor 55 serves as one portion of the communication link and connects switch 29 with solenoid 57 for advancing sequential stepping switch 11 and automatic stepping means 33. COnductor 65, also included in the communication link, serially connects solenoid 57 and counting means 45 via appropriate switch means such as switch 67. Thus, activation of switch 29 closes the switch 67, part of latching relay 49, to serially connect counting means 45, conductor 65, and solenoid 57. Accordingly, each time solenoid 57 is energized when the switch 67 is closed, power is transmitted over conductor 65 to energize a counting solenoid in counting means 45. As power is removed by the breaking of the circuit at contact switch 35, the respective solenoids in the sequential stepping switch and the counting means are returned to normal, advancing both the sequential stepping switch and the counting means.

A disconnecting means 51, at the remote position, is connectable via appropriate means such as alligator clamp 53 with a selected conductor at the remote position and is operable to stop counting means 45 by opening switch 67 of latching relay 49 upon receipt of the identifiable signal on the conductor to which alligator clamp 53 is connected. As illustrated, disconnecting means 51 is connected via alligator clamp 53 with conductor ($n$—1). Disconnecting means 51 comprises filter 81, amplifier 85, and rectifier 89; serially connected, as by conductors 83 and 87. Filter 81 passes the identifiable signal but screens out high frequency noise spikes and the like and thereby insures that counting means 45 is disconnected only upon the presence of the identifiable signal on conductor ($n$—1).

As illustrated, sequential stepping switch 11 has at least a pair of deck means 17 to enable connecting a pair of telephone wires in each correlatively identifiable pair of wires; and a pair of counting means 45 and 93 are employed at the remote position with their respective connecting means, disconnecting means, and alligator clamps 53 and 95.

In operation, the wire pairs of cable 15, identified at the office, are connected sequentially and respectively according to their identification, normally numerical as indicated, with contacts 13 on sequential stepping switch 11. The respective terminals 23 and 25 are connected with signal generator 39, which may be an oscillator. The solenoid 57 and signal generator 39 are connected with power source 37. The signal generator is started to run by closing switch 73. At this time contact switch 36 in automatic stepping means 33 will be open or sequential stepping switch 11 will step to the zero position to open contact switch 36. Solenoid 57 is also appropriately connected with conductors 55 and 65.

The repairman then goes to the remote position at which the respective wire pairs are to be identified. The remote position may be a field position at which the telephone cable has been cut and telephone service is to be restored or it may be an established position at which the wire pairs are to be identified for one or more purposes; such as, "making a throw." By "making a throw" is meant changing the connections of a group of wire pairs coming from the field from one group of wire pairs coming from the central office to another group therefrom.

In any event, the repairman identifies the cable pair or pairs serving functionally as the respective conductors 55 and 65 in a communication link and connects them respectively with switch 29 and the counting means 45 and 93. The cable pair or pairs may have been previously tagged by a repairman at an established field location or may be identified separately by any of the conventional and less desirable techniques delineated hereinbefore.

The repairman also connects the downstream side of switch 29 with the appropriate numbers of connecting means such as latching relays 49, incorporating respective switches 67 and 99. The upstream side of switch 29 is serially connected with power source 31. Alligator clamps 53 and 95 are connected at random with respective selected conductors. The appropriate filter, amplifier, rectifier, and relay of the disconnecting means 51 will have been appropriately connected so as to effect via relay 91 opening of switch 67 upon the occurrence of the identifiable signal on the conductor with which alligator clamp 53 is connected. Similarly, relay 101 is energized upon the occurrence of the identifiable signal on the conductor with which clamp 95 is connected, consequently, opening switch 99. The repairman zeros the counting means as by depression of reset button 97 and a cycle is ready to begin. The zeroing of the counting means also effects synchronization with the sequential stepping switch, since it will have automatically stepped to the zero position before stopping. If desired, appropriate automatic synchronization of the counters may be employed by interconnection of the counting means with the downstream side of the switch 29 such that they are automatically synchronized with the stepping switch upon depression of switch 29.

Switch 29 is depressed momentarily to close latching relays 49 and connect the counting means 45 and 93 onto conductor 65; also energizing solenoid 57 of sequential stepping switch 11 and energizing the counting solenoid in the counting means. Energizing and deenergizing solenoid 57 starts a cycle and accomplishes, primarily, two events. First, the counting means is advanced to the first number and wiper arms 19 and 21 are stepped onto the first contact. The identifiable signal, such as a tone, from signal generator 39 is applied onto the first wire pair connected with the first set of contacts on decks 17 of sequential stepping switch 11. Second, cam 40 is rotated, allowing contact switch 36 to close and supply power for automatically stepping solenoid 57 each time contact switch 35 is closed; as when solenoid 57 is returned to its normal position by spring 59. Thus, automatic stepping means 33 is actuated to automatically step wiper arms 19 and 21 to the next respective contacts when solenoid 57 is returned to normal. When solenoid 57 returns to the normal, or at rest, position, contact switch 35 is allowed to close by cam 38 again energizing solenoid 57 and energizing the solenoids in the respective counting means at the remote position. After sufficient movement to the left that the pawl of solenoid 57 has picked up the next notch, cam 38 opens contact switch 35. The counting means is advanced to the second number and solenoid 57 is again moved to the right by spring 59, advancing wiper arms 19 and 21 to the next, or second, contact. Consequently, the identifiable signal is impressed onto the second wire pair.

As indicated hereinbefore, each time solenoid 57 returns to its normal position to advance the contacts, contact switch 35 is closed to energize it again, also energizing the solenoid in the counting means. When deenergized, both the sequential stepping switch 11 and the counting means are advanced and an identifiable signal is impressed onto the next sequential and consecutive conductor, or, as illustrated, wire pair. The counting signal and the identifiable signal are transmitted in their respective order over their respective conductors as nearly simultaneously as need be and travel one way over their conductors to arrive at the remote position as nearly simultaneously as need be, regardless of the amount of propagation delay or the distance over which they must travel in going through cable 15. Thus, the counting means is always signaled to advance to the next number as the sequential stepping switch advances to the next, or same, numbered conductor before a signal is impressed onto the conductor to the disconnecting means to disconnect the counter if present on the conductor with which the counter is connected. Also as indicated hereinbefore, if the identifiable signal is present on the conductor with which the respective alligator clamps are connected, the identifiable signal is passed to disconnect the associated counting means; for example, passed through filter 81, and amplified and rectified by the respective amplifier 85 and rectifier 89 to energize relay 91, opening switch 67.

As illustrated, when sequential stepping switch 11 steps onto the ($n$—)th contact, alligator clamp 53 and conductor 83 will conduct the identifiable signal into the disconnecting means which will open switch 67 and stop counting means 45 on ($n$—1)th counting pulse to show that clamp 53 was connected with that numbered wire, or conductor.

Although counting means 45 is disconnected and stopped from counting, the automatic stepping means continues to step sequential stepping switch 11 until contact switch 36 is opened, as by cam 40. As illustrated, sequential stepping switch 11 is stepped through all of the contacts before it is stopped at the zero position, and ready for advancing as soon as the repairman depresses switch 29 in actuating means 27.

The second counting means 93 is connected to the nth conductor via alligator clamp 95. Accordingly, when the signal from signal generator 39 is connected to the $n$th conductor, counting means 93 will be disconnected by its appropriate disconnecting means by switch 99 being opened by relay 101.

Thus, the wires $n$ and $n$—1 can be tagged, as by being hooked onto an appropriate tag board, and additional wires connected with respective disconnecting means via the respective alligator clamps. Once a new pair of predetermined wires have been connected by the respective alligator clamps, button switch 29 is depressed and the cycle described hereinbefore is repeated. That is, the sequential stepping switch 11 is stepped through all of the conductors connecting the identifiable signal from signal generator 39 with respective and individual ones, and the respective counting means are stopped when the identifiable signal is detected on the conductor with which they are connected.

In summary, the invention comprises improved method and apparatus for cable conductor identification characterized by automatically stepping a source of an identifiable signal onto respective conductors at an identified end thereof; synchronously stepping a coconnected counting means at a remote position where a conductor is to be identified until the tone is detected on the given conductor with which the counting means is also connected; and thereupon stopping the counter. The counter thus identifies the conductor being monitored and the sequential stepping switch continues to step around to the zero position where it is again ready for another cycle when actuated by actuating means 27.

Two features of the invention merit particular note. In a first feature, sequential stepping switch 11 continues to step around to the zero position even through the counting means such as counting means 45 will have been stopped when the identifiable signal was detected on the conductor with which the counting means is connected via respective alligator clamps such as clamp 53. Thus, time is saved, since the sequential stepping switch is ready to begin a new cycle as soon as the repairman synchronizes the counting means to a zero, or staring position; and no additional time is required in having to move the sequential stepping switch 11 to the zero position each time a new wire is to be identified.

In the second feature, a counting pulse, or signal, is sent to the counting means in a predetermined order with respect to the imposition of an identifiable signal onto a respective conductor; and the order is preserved throughout propagation via the communication link and reception by the counting means and by the disconnecting means. This sequence of operations in which a counting pulse is transmitted over a conductor 65 and an identifiable signal transmitted over fixed conductor may be thought of as a sub-cycle of operation. Thus, each sub-cycle is a discrete entity in which the signals are transmitted and received in a given order; and the invention does not require any feedback information, so adverse effects of propagation delay are alleviated. Expressed otherwise, the invention does not have to rely upon a transmission from the remote position back into the office for identification; and, hence, there is no problem with propagation delays. As is well known, propagation delays are particularly troublesome in always obtaining synchronous counting and positive identification by the counting means when two-way transmission is required.

To illustrate specifically, recall that power is supplied to energize solenoid 57 and is simultaneously supplied via conductor 65 to energize a counting solenoid in counting means 45. Neither the counter in counting means 45 nor the wiper arms in stepping switch 11 are advanced until power is released, as by opening of contact switch 35. Thereafter, both counting means 45 and wiper arms 19 and 21 of sequential stepping switch 11 are advanced as the respective solenoids are returned to their normal position by spring action. When wiper arms 19 and 21 reach the next contact, as noted by counting means 45, the identifiable signal is impressed onto the conductor and if the alligator clamp of one of the counting means is connected thereto, the disconnecting means is energized, disconnecting the respective counting means by opening the respective switch connecting the counting means with conductor 65 before the next counting pulse is received over conductor 65. As higher rates of stepping the sequential stepping switch 11 through the respective contacts are employed, it becomes necessary that the impression of the counting signal and the identifiable signal onto their respective conductors become more nearly simultaneous. In the embodiment described, the counting signal may be thought of as the trailing edge of the pulse energizing the solenoid which is substantially the same time as the respective wiper arms are advanced onto the next contact. The sequential stepping switch 11 readily steps through 10 contacts per second such that it will step through an entire set of 50 contacts in about 5 seconds. The signals are transmitted over their respective conductors at about 18,000 miles per second, about one tenth the velocity such signals would be transmitted in free space. Thus, the signals are received at distances up to 10 miles from the end at which they are transmitted in less than one one hundred eightieth of a second. There is plenty of time for a given sub-cycle to be completed, including the reception of the respective signals, before the following sub-cycle is entered. Sequential stepping switches will be employed, however, that step at a frequency as high as one thousand steps per second. With such a repetition rate it becomes apparent that the imposition and transmission of the respective signals must more nearly approach the optimum of simultaneous transmission of the respective signals and simultaneous reception, since the sequential stepping switch may have completed one or more sub-cycles before the first ordered signals are received by the counting means at the remote position. This ability to proceed ever more closely to the optimum of simultaneous imposition and transmission of the counting signal and the identifiable signal; without having to rely upon transmission back from the remote position, and thereby alleviating the adverse effects of propagation delay; is a significant facet of this invention and allows great flexibility in improving the design of the equipment as faster acting components become available and economically feasible.

Within the purview of the general approach outlined herein, many specific ways of accomplishing the results will come to mind. For example, the counting signal, which is here the trailing edge of a pulse energizing solenoid 57, could be the front edge with certain positively and synchronously acting counting means and sequential stepping switches. The objective of this invention is to effectuate synchronous movement of the stepping switch and the counting means and insure positive and accurate identification when an identifiable signal is detected upon a conductor with which the counting means is also connected.

Any communication link can be employed which will transmit the required data and command signals as indicated hereinbefore. Instead of specific extra conductors in the cable, other communication links; such as, radio communication and modulation-demodulation of a carrier signal; can be employed.

Although a sequential stepping switch 11 using a solenoid and wiper arms has been described in this embodiment, there may be employed any other sequential stepping switch or sequential switching device; such as, a cross bar switch or other random access switch device; that can be programmed to switch in a sequential manner. For example, solid state switching devices having a plurality of contacts can be employed as sequential stepping switches. While only a few contacts on each deck are illustrated in the interest of clarity and simplicity, any number can be employed. For example, it has been found advantageous to employ about 50 contacts on each deck, or 100 contacts per stepping switch.

A stepping switch employing duplicate decks of contacts has been described in this preferred embodiment because of its advantage with respect to identifying wire pairs in a multi-wire cable. Single decks may be employed, particularly where only signal conductors are to be identified at the remote position as in aircraft or ocean-going vessels. Similarly, more than two decks may be employed, if advantageous and desirable. For example, some telephone sequential stepping switches contain four decks of contacts.

Any other automatic stepping means that will effect the described stepping of the sequential stepping switch may be employed instead of the embodiment described. For example, stepping switches may be purchased with automatic stepping contacts.

Any identifiable signal may be employed to identify the wire carrying that signal. The tone from an oscillator, serving as a tone generator, has been described hereinbefore since it affords a relatively positive method of identification. On the other hand, discrete voltages or coded signals may be imposed on the wire and the disconnecting means designed to be activated by the particular identifiable signal employed.

As indicated, the disconnecting means comprises circuitry or components that will be responsive to the identifiable signal and disconnect the counting means upon the detection thereof. The disconnecting means may employ resonant relays, correlation detectors, pulse detectors and the like, as well as the components described herein.

The counting means may be electromechanical, electronic, or any type of resettable counters compatible with and responsive to the counting pulse received at the remote position.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. In a method of identifying at a remote position conductors in a multi-conductor means having the conductors identified at one end thereof, the improvement comprising:

a. connecting said conductors at said one end in sequence according to their identification to contacts of a sequential stepping switch operable to electrically connect said contacts with a terminal;
b. establishing communication from said remote position with said sequential stepping switch;
c. actuating said sequential stepping switch from said remote position to automatically and sequentially step said stepping switch to individually and sequentially connect a pre-selected plurality of said identified conductors with said terminal and then automatically stop said stepping switch after stepping completely through said pre-selected plurality of said identified conductors, thereby completing one cycle, independently of the conductor on which a counting means at said remote position is stopped such that there will be no error caused by communication lag therebetween;
d. imposing via said terminal an identifiable signal on each said identified conductor when it is connected therewith;
e. driving a counting means at said remote position by the sequential stepping of said stepping switch at said one end; said driving of said counting means by said sequential stepping of said sequential stepping switch being synchronous with said imposing of said identifiable signal on each said identified conductors such that only one-way communication from said one end to said remote position is necessitated during each step of each cycle; and
f. stopping said counting means by disconnecting it from said sequential stepping switch such that said counting means is no longer driven by the stepping thereof, when said identifiable signal is received on a selected conductor at said remote position without having to stop said sequential stepping switch on the same conductor, whereby said counting means identifies said selected conductor.

2. The method of claim 1 wherein said sequential stepping switch is stepped through all of said conductors connected thereto upon being actuated.

3. The method of claim 1 wherein said conductors comprise a plurality of correlatably identifiable wires in a cable and each wire is connected according to its identification at the respective correlative position to respective contacts on the same plurality of deck means that are included in said sequential stepping switch, said deck means being stepped simultaneously and correlatively to connect respective said contacts with a respective terminal; said identifiable signal is imposed via each said terminal simultaneously on each of said plurality of wires having the same correlative identification.

4. The method of claim 3 wherein a plurality of counting means at said remote position are advanced simultaneously and responsively, each counting means being also connected with a respective wire; each respective said counting means being stopped when said identifiable signal is received on the respective wire with which it is connected; whereby each said counting means identifies a respective said wire and more speedily enables correlation of the wire pairs at said remote position.

5. The method of claim 1 wherein a counting pulse is transmitted for advancing said counting means, and said counting pulse and said identifiable signal are both transmitted via, respectively, the communication link and the respective conductor concurrently and simultaneously so as to arrive at said remote position simultaneously and thereby neutralize adverse effects of propagation delay in said communication link; and, since no feedback is required over said communication link from the counting means at said remote position to said one end, thereby insure accurate identification by said counting means.

6. In a system for identifying at a remote position conductors in a multi-conductor means having the conductors identified at one end thereof spaced from said remote position, the improvement comprising:

a. a sequential stepping switch having a plurality of contacts electrically connected with respective conductors at said one end of said multi-conductor means and operable to electrically connect, sequentially and respectively, said contacts with a terminal;
b. automatic stepping means connected with said sequential stepping switch and operable when actuated to cause said sequential stepping switch to electrically connect individually and sequentially a pre-selected plurality of respective ones of said contacts with said terminal and then automatically stop said stepping switch after stepping completely through said pre-selected plurality of said contacts, thereby completing one cycle, independently of the conductor on which a counting means at said remote position is stopped such that there will be no error caused by communication lag therebetween;
c. an identifiable signal source connected with said terminal for imposing an identifiable signal onto each said conductor that is connected with said terminal;
d. a communication link between said remote position and said one end;
e. actuating means at said remote position connected with said stepping switch and said automatic stepping means via said communication link; said actuating means being operated only to initiate a cycle of stepping through said pre-selected plurality of contacts;

f. a counting means at said remote position;

g. connecting means responsive to said actuating means and operable to connect said counting means with said automatic stepping means and said sequential stepping switch; and h. disconnecting means connectable with a selected conductor at said remote position and operable to stop said counting means by disconnecting it from said sequential stepping switch and said automatic stepping means upon receipt of said identifiable signal on said selected conductor without having to stop said sequential stepping switch on the same conductor;

i. said counting means being operable to count each time said sequential stepping switch connects said terminal with another conductor such that said counting means is driven by the automatic stepping of said sequential stepping switch synchronously with the imposing of said identifiable signal onto respective said conductors until said disconnecting means stops said counting means; whereby only one-way communication from said one end to said remote position is necessitated during each step of a cycle.

7. The system of claim 6 wherein said automatic stepping means connected with said sequential stepping switch is operable, when actuated, to cause said sequential stepping switch to electrically connect, respectively and sequentially, all of said contacts with said terminal and then stop until actuated again.

8. The system of claim 6 wherein said conductors comprise a plurality of correlatively identifiable wires; said stepping switch has the same plurality of deck means, each said deck means being stepped simultaneously as said stepping switch is stepped, having a plurality of contacts electrically connected with respective ones of said plurality of wires at said one end and operable to electrically connect, sequentially and respectively, said contacts with a respective terminal on each said deck means; said identifiable signal source is connected with each said respective terminal.

9. The system of claim 8 wherein are included the same plurality that there are of correlatively identifiable wires of respective counting means, connecting means, and disconnecting means, said plurality of respective connecting means being responsive to said actuating means, said disconnecting means being connectable with the same plurality of unidentified and selected wires at said remote position and operable to stop respective said counting means upon receipt of said identifiable signal on the wire to which it is connected.

* * * * *